UNITED STATES PATENT OFFICE.

HORACE KELSEY, OF OTTAWA, KANSAS.

IMPROVEMENT IN FRUIT-GATHERERS.

Specification forming part of Letters Patent No. 138,565, dated May 6, 1873; application filed September 28, 1872.

*To all whom it may concern:*

Be it known that I, HORACE KELSEY, of Ottawa, in the county of Franklin and State of Kansas, have invented a new and useful Improvement in Fruit Gatherer, of which the following is a specification:

In the accompanying drawing, Figure 1 is a cross-section of my improved fruit-gatherer, taken through the line $x\ x$, and shown as applied to the trunk of a tree. Fig. 2 is a top view of the same.

Similar letters of reference indicate corresponding parts.

My invention is an improvement in the class of fruit gatherers in which a cloth body is temporarily attached to the body of the tree and supported at its outer edge by suitable braces; and the improvement consists mainly in a peculiar arrangement of a spout and of blocks for supporting the inner edge of the cloth body or fruit receiver, in such relation to each other as to insure the delivery of the fruit through a single spout in a safe and efficient manner, all as hereinafter described.

A is the cloth body of the gatherer, which is made of triangular pieces of muslin or other suitable material, similar to the cover of an umbrella, except that it is made with a radial opening to enable it to be passed around and removed from the trunk of the tree. To the body A are attached radial arms B, somewhat similar to the ribs of an umbrella. In the center of the body A is formed a hole for the passage of the trunk, to which it is secured by a cord or strap, C, passed through a fold or hem of the body A, or around the inner edge of said body, at the inner ends of the arms B. The body A is so formed that when its open edges are hooked, clasped, tied, or otherwise secured to each other, it may resemble in form an inverted umbrella, as shown in Fig. 1. The outer ends of the arms B are supported in position by the braces or stakes D, the upper ends of which are inserted in rings or loops attached to the ends of the said arms B, or in holes formed in said ends. The center of the body A is further supported and prevented from slipping down upon the trunk of the tree by the strap E, to which are secured a number of beveled blocks F, which are of different lengths, and which are so arranged upon the strap E that the plane of their upper ends may be inclined or higher at one side of the tree than at the other, so that the central part of the body A may be higher at one side of the tree than at the other, to cause the fruit to roll to the lower side. In the body A near its center is formed a hole, in which is secured one end of a spout, G, made of muslin or other cloth, the other end of which is designed to be placed in a basket or other receptacle for the fruit, so that the fruit that falls upon the body A when the tree is shaken may roll gently down into said receptacle without being bruised or otherwise injured.

In applying the gatherer to a tree for use, the strap and beveled blocks E F are first secured to the tree as near as practicable to the branches. One of the open sides of the body A is then tied or hooked to a convenient limb, and the central part of the said body is secured to the tree just above the strap and blocks E F, care being taken to so arrange the body A that the spout G may be opposite the shortest blocks F. The body A is then raised into proper position and its open edges secured to each other. The braces or stakes D are then put into place, and the gatherer is ready for use.

I do not claim broadly a fruit-gatherer formed of cloth or other flexible material, nor the use of a flexible or other spout in connection therewith; but

Having thus described my invention, what I claim as new, and desire to secure by Letters Patent, is—

The strap and beveled blocks E F, in combination with the flexible body A provided with the spout G, as and for the purpose specified.

HORACE KELSEY.

Witnesses:
P. L. EARNEST,
R. W. BARNEY.

H. KELSEY.
Fruit-Gatherers.
No. 138,565.　　　　　　　　　　Patented May 6, 1873.
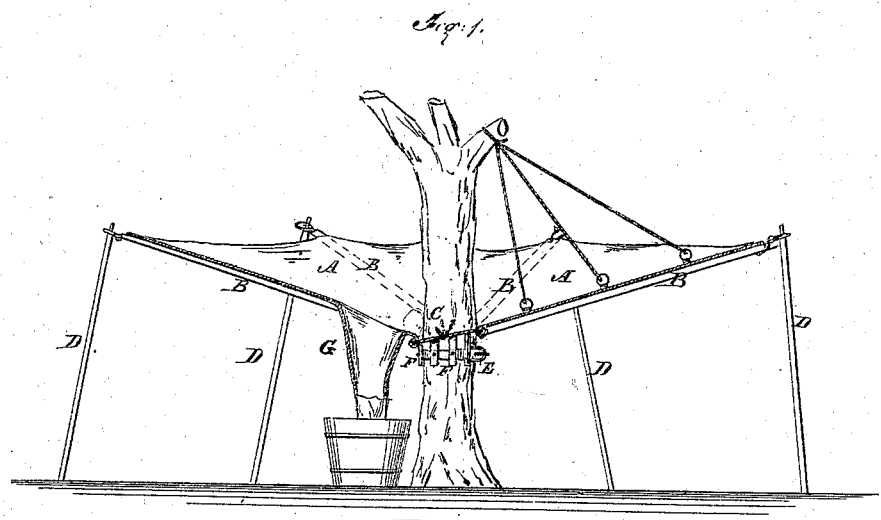
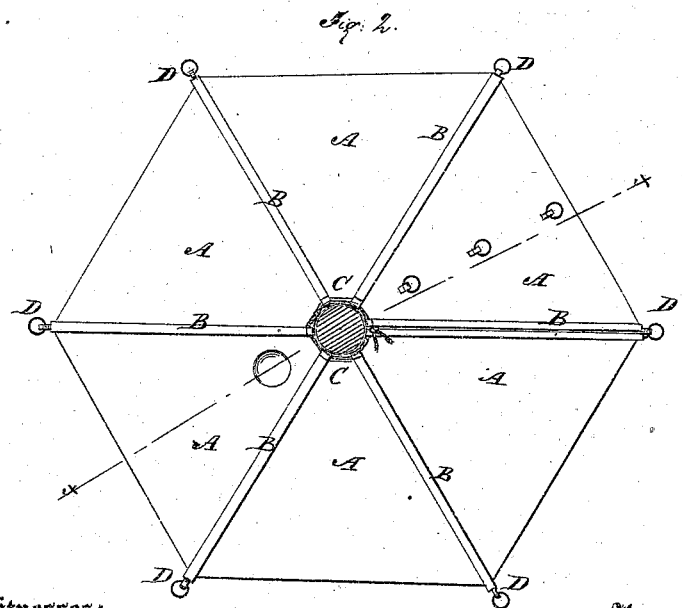
Witnesses:　　　　　　　　　　Inventor:
　　　　　　　　　　　　　　　　H. Kelsey
　　　　　　　　　　　　per
　　　　　　　　　　　　　　　　Attorneys.